United States Patent [19]

Miller

[11] Patent Number: 4,932,705
[45] Date of Patent: Jun. 12, 1990

[54] FLEXIBLE LOUVER-FLOW TAILGATE BARRIER

[76] Inventor: Jack V. Miller, 700 N. Auburn Ave., Sierra Madre, Calif. 91024

[21] Appl. No.: 258,672

[22] Filed: Oct. 17, 1988

[51] Int. Cl.⁵ .............................................. B62D 25/00
[52] U.S. Cl. ..................................... 296/50; 296/180.1
[58] Field of Search ..................... 296/180.1, 50, 57

[56] References Cited

U.S. PATENT DOCUMENTS

| | | | |
|---|---|---|---|
| 4,136,905 | 1/1979 | Morgan | 296/50 |
| 4,353,589 | 10/1982 | Hartberg | 296/50 |
| 4,763,944 | 8/1988 | Fry et al. | 296/180.1 |

*Primary Examiner*—Robert R. Song

[57] ABSTRACT

A tailgate barrier for closing the open end of a truck bed is a rectangular sheet of substantially inelastic flexible material held as a membrane in bi-axial tension by continous elongated upper and lower edges extending to a tension strap at top and bottom corners of each end, the membrane being provided with a pattern of perforations, each of which is in the form of a generally U-shaped slit wherein the central portion of the U is a depending flap that flexes out of the plane of the membrane during the passage of air flow through the membrane.

A preferred embodiment has an arcuate tension member connecting the top and bottom corner at each end.

Another preferred embodiment has printed indicia that extends across the membrane and at least some of the depending flaps of the perforations.

11 Claims, 2 Drawing Sheets

FLEXIBLE LOUVER-FLOW TAILGATE BARRIER

BACKGROUND OF THE INVENTION

It has been long recognized that the turbulent drag of an open-top truck body, such as is used on a pick-up truck, can be reduced by opening or perforating the tail gate. A number of perforated replacement tailgates are presently marketed, such as is shown in U.S. Pat. No. 4,353,589, in which a replacement tailgate has a perforated membrane supported in a rigid metal frame.

Other similar products are available in which a net-like membrane is made of vertical and horizontal webbing straps that are stitched together and attached to the sides of the pick-up truck bed, and still other products punch square holes to form a pattern of orthogonal straps in a fabric-reinforced flexible membrane that simulates the substantial open area of a webbing strap tailgate. In order to keep the straps taut it is the practice to attach each end of the membrane to a metal vertical stiffener, and to attach the corner straps to the respective truck bed corners with adjustable straps connected to the stiffeners.

A disadvantage of presently known webbing-style tailgates is that they are very limited in area available for printed indicia. It is the practice of pick-up truck manufacturers to apply a large logo across the metal tailgate if their trucks, and then the dealer normally adds a plaque or decal to the tailgate as well. The indicia area for such logos is very limited on webbing or die-cut simulated webbing.

Another disadvantage of prior art webbing-style tailgates is that the large open area exposes the entire cargo area to public view.

It is the purpose of the present invention to provide a perforated membrane tailgate that provides a large open area for free air flow, but also retains the surface area of for printed indicia. It is a further purpose of the present invention to provide a tailgate that has free air flow, but substantially blocks the truck cargo from view.

SUMMARY OF THE INVENTION

A tailgate barier for closing the open end of a truck bed is a rectangular inelastic sheet of flexible material that is perforated in a regular pattern that permits substantially free flow of air throught he membrane. The membrane is provided with generally inelastic elongated upper and lower edges extending to a tension strap at each of the corners of the ends, in a substantially straight horizontal tension paths across the upper and lower edges of the membrane and terminating in adjustable straps at each corner of each end, in which the straps also appy tension in and an arcuate tension path between the upper corner and lower corner of each end of the membrane.

A preferred embodiment has perforations which are generally U-shaped where the central portion of each U is a depending flap that flexes out of the plane of the membrane, forming a louver that permits the flow of air through the perforation.

Another preferred embodiment has printing that extends across the surface of the membrane, and extends across at least some of the depending flaps of the perforations, whereby a printed message or logotype is completely viewable when the louvers are quiescent and in the plane of the membrane, and is still substantially readable when the louvers are open and trailing in air flowing through the membrane.

DETAILED DESCRIPTION OF THE DRAWINGS

Figure 1:
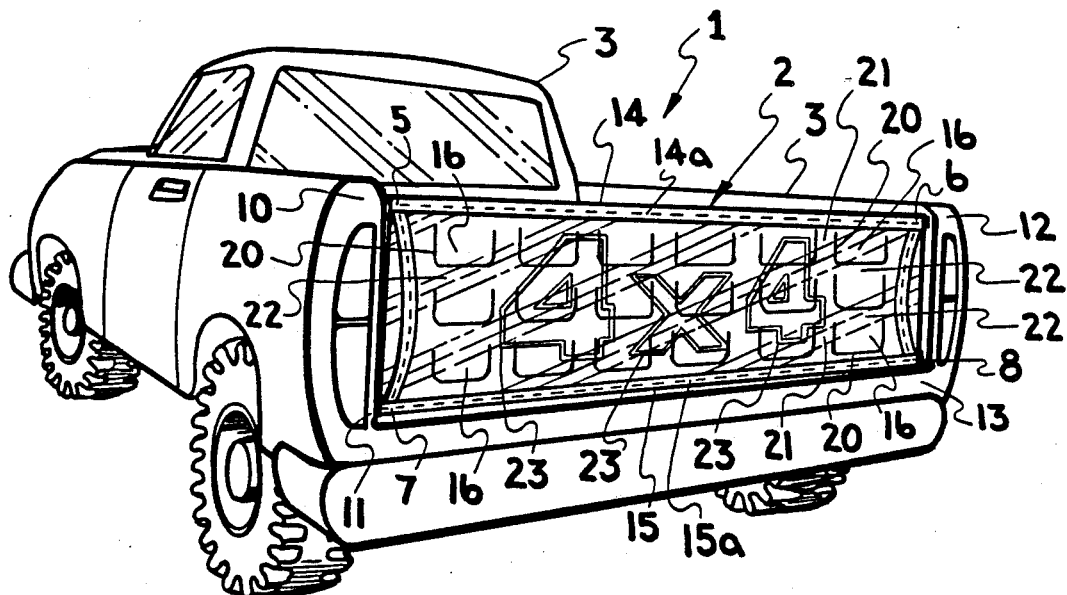
FIG. 1 is a rear-quarter perspective view of a tailgate according to the invention and installed in a pick-up truck.

In FIG. 1 a tailgate 1 is made of a substantially inelastic flexible sheet of membrane material 2 and is shown mounted in the open bed 2 of a pick-up truck 3 by the tensioned attachment of corner straps 5, 6, 7 and 8 at a first upper corner 10, second upper corner 12, a first lower corner 11 and a second lower corner 13 a first lower corner 11, a second upper corner 12 and a second lower corner 13, respectively said corner straps pulling the membrane into tension both horizontally and vertically, ie: "bi-axial" tension. Tension applied between the first upper corner 10 to the second upper corner 12 places the upper edge 14, which may be optionally reinforced with a webbing strap 14a, in a substantially straight tension path, and tension applied between the first lower corner 11 and the second lower corner 13 places the lower edge 15, which may be optionally reinforced with a webbing strap 15a, in a substantially straight tension path. Tailgate 1 is provided with a pattern of depending louver flaps 16, formed by generally U-shaped slits 20, which are separated by vertical webs 21 and horizontal webs 22 in an orthogonal pattern. Brand name, advertising or special interest indicia 23 may be printed on the sheet material of the tailgate prior to cutting the U-shaped slits 20.

Figure 2:
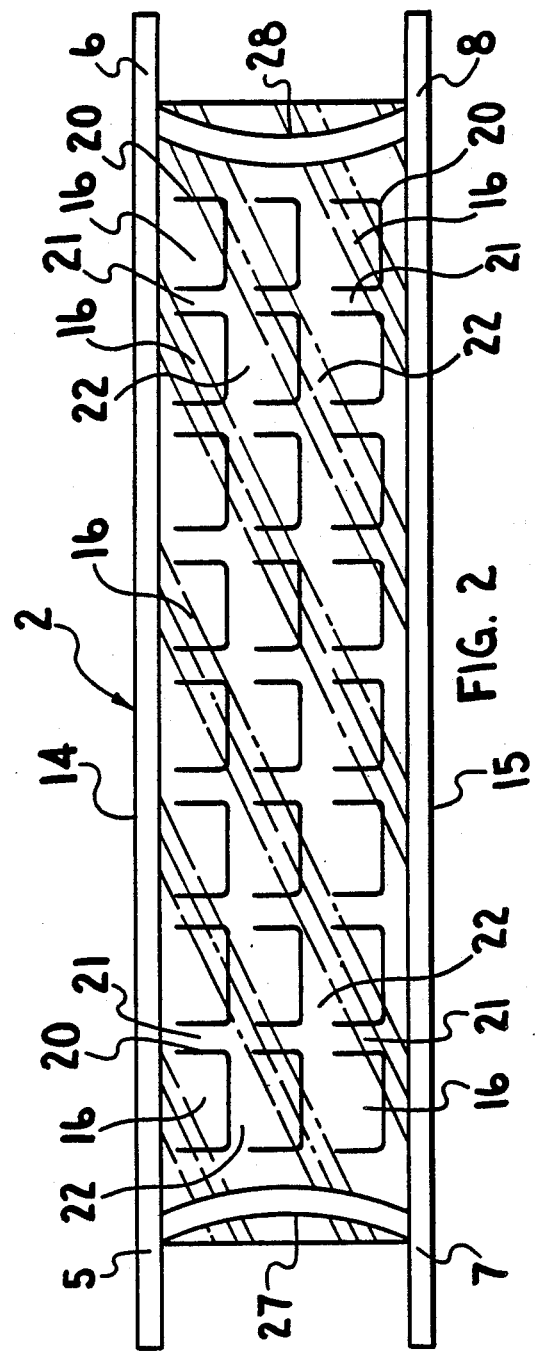
FIG. 2 is a rear elevation view of the tailgate of FIG. 1.

In FIG. 2 tailgate membrane 2 is shown having the top edge 14 extending between top corner straps 5 and 6, and the bottom edge 15 extending between bottom corner straps 7 and 8, said top and bottom edges being reinforced by forming stitched folded seams or by the application of woven textile webbing straps 17. A first arcuate reinforcement 27 made of an inelastic flexible strap material is applied to the membrane 2 by stitching bonding or other attachment means between top corner strap 5 and bottom corner strap 6, and a second arcuate reinforcement 28 is applied between top corner strap 7 and bottom corner strap 8, whereby substantially bi-axial tension is applied to the membrane.

Figure 3:
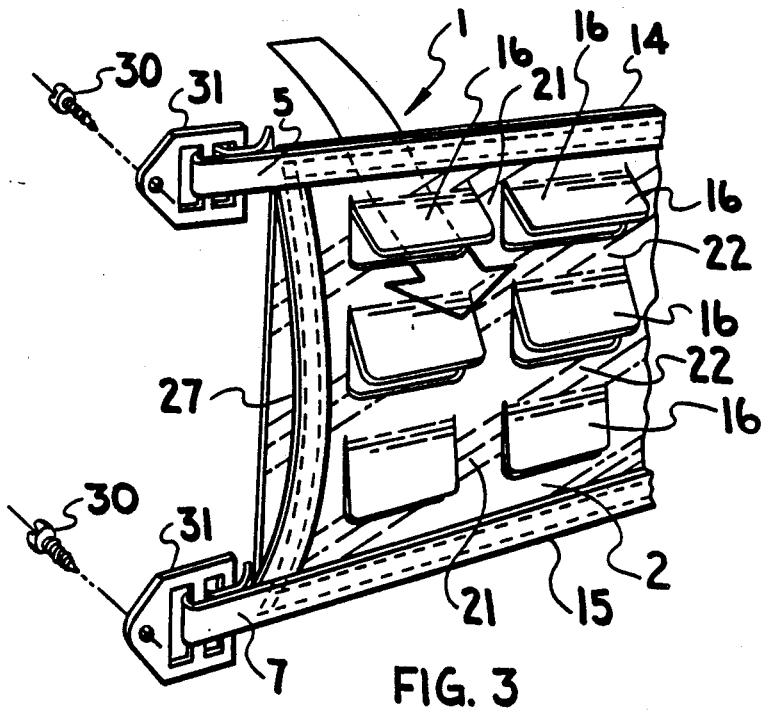
FIG. 3 is a perspective view of a portion of the tailgate of FIG. 1, showing the configuration during the passage of air through the membrane.

In FIG. 3 tailgate 1 is partially shown with attachment fasteners 30 to secure the adjustable buckles 31 to attach the corner tension straps 5 and 7 to the bed of a truck thereby applying both horizontal and vertical tension (bi-axial tension) to the membrane 2. The arcuate reinforcement 27 is shown attached to between upper and lower tension straps 5 and 7, whereby vertical tension on the arcuate reinforcement 27 will apply horizontal tension to the horizontal webs 22 of membrane 2. In operation the airflow through louver flaps 16 is shown as they are opened out of slits 20 to trail freely in the wind. The top edge of each louver flap 16 is retained substantially in the plane of the tailgate by bi-axial tension of the top edge 14 and the bottom edge 15; tension between top corner the vertical webs 21 and the horizontal webs 22. The louver flaps 16 will open only as required for wind flow, generaly obscuring the truck bed interior from view.

It will be apparent to one skilled in the art that the depending flaps may be made in alternate configurations other that the simplest form of a U that is shown and described in the present invention. Other shapes, such as triangles, or shallow arcuate louvers are feasible, if not optimum; and are considered within the scope of the invention. It will also be apparent to one skilled in the art that the arcuate tension members may be in the form of a series of straight segments to distribute the stress biaxially in the membrane. Although these forms may be less than optimum structurally and aesthetically, they are operable in performance of the membrane in accordance with the intent of the invention, and are not shown herein in the interest of clarity and simplicity, but are considered within the scope of the invention.

I claim:

1. A trailgate barrier for closing the open end of a truck bed including first and second vertical sidewalls having upper and lower ends and a flat bottom, said barrier comprising a flexible, substantially inelastic rectangular membrane having rectangular membrane having elongated upper and lower edges with elongated upper and lower edges with a first upper corner at a first end, a first lower corner at the first end, a second upper corner at a second end, and a second lower corner at the second end;

means for applying tension between the first upper corner of the membrane and the upper end of the first truck bed sidewall, between the first lower corner of the membrane and the lower end of the first truck bed sidewall, between the second upper corner of the membrane and the upper end of the second truck bed sidewall, between the second lower corner of the membrane and the lower end of the second truck bed sidewall, respectively, whereby the said flexible membrane is in tension bi-axially in both the horizontal and vertical directions a substantially straight tension path across the upper edge of the membrane between the first and second upper corners, a substantially straight tension path across the lower edge of the membrane between the first and second lower corners of the membrane, respectively; and a first arcuate tension path between the first upper corner and the first lower corner, and a second arcuate tension path between the second upper corner and the second lower corner of the membrane.

2. A tailgate barrier according to claim 1 in which the ends of the membrane between the first upper corner and first lower corner, and the second upper corner and second lower corner, respectively, are in a straight vertical line within the respective arcuate tension paths.

3. A tailgate barrier according to claim 1 in which the membrane is provided with a pattern of perforations comprising at least 25% of the membrane area, in which each perforation is generally U-shaped, and wherein the central portion of each U is a depending flap that flexes out of the plane of the membrane to permit flow of air through the perforation.

4. A tailgate barrier according to claim 3 in which the perforations are regularly spaced along a plurality of rows wherein the sheet material between perforations forms an orthogonal grid pattern.

5. A tailgate barrier according to claim 3 in which printed indicia extend across the membrane and at least some of the depending flaps.

6. A tailgate barrier according to claim 1 in which the upper and lower edges and the arcuate tension paths are reinforced with inelastic lengths of flexible material.

7. A tailgate barrier according to claim 6 in which the upper and lower edges and the arcuate tension paths are reinforced with flexible material identical to that of the membrane and attached to the membrane.

8. A tailgate barrier according to claim 6 in which the inelastic lengths of flexible material are woven texile webbing that is stitched to the membrane.

9. A tailgate barrier according to claim 1 in which each corner attachment means is an adjustable buckle attachable to the truck bed.

10. A tailgate barrier for closing the open end of a truck bed including first and second vertical sidewalls having upper and lower ends and a flat bottom, said barrier comprising a flexible, substantially inelastic rectangular membrane having and elongated upper and lower edges with a first upper corner at a first end, a first lower corner at the first end, a second upper corner at a second end, and a second lower corner at the second end, in which the membrane is provided with a pattern of perforations that are generally U-shaped, wherein the central portion of each U is a depending flap that flexes out of the plane of the membrane during the flow of air through the perforation;

means for applying tension to the membrane by attachment between the first upper corner of the membrane and the upper end of the first truck bed sidewall, between the first lower corner of the membrane and the lower end of the first truck bed sidewall, between the second upper corner of the membrane and the upper end of the second truck bed sidewall, and between the second lower corner of the membrane and the lower end of the second truck bed sidewall, respectively, whereby the membrane is held substantially in a vertical plane and the depending flaps are free to trail out of the plane of the membrane during the passage of air through the membrane.

11. A tailgate barrier according to claim 10 in which the membrane has a plurality of perforations spaced along a plurality of rows and the area of the perforation comprises at least 25% of the total membrane area.

* * * * *